US010721328B2

(12) United States Patent
Chen et al.

(10) Patent No.: US 10,721,328 B2
(45) Date of Patent: Jul. 21, 2020

(54) OFFERING APPLICATION PROGRAM INTERFACES (APIS) FOR SALE IN CLOUD MARKETPLACE

(71) Applicant: International Business Machines Corporation, Armonk, NY (US)

(72) Inventors: Han Chen, White Plains, NY (US); Nicholas C. M. Fuller, North Hills, NY (US); Minkyong Kim, Scarsdale, NY (US); Isabelle M. Rouvellou, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 900 days.

(21) Appl. No.: 14/836,666

(22) Filed: Aug. 26, 2015

(65) Prior Publication Data

US 2017/0064038 A1 Mar. 2, 2017

(51) Int. Cl.
*H04L 12/24* (2006.01)
*H04L 29/08* (2006.01)
*G06F 16/951* (2019.01)
*H04W 12/08* (2009.01)
*H04L 29/06* (2006.01)
*G06F 9/50* (2006.01)
*H04W 12/00* (2009.01)

(52) U.S. Cl.
CPC .......... *H04L 67/327* (2013.01); *G06F 9/5072* (2013.01); *G06F 16/951* (2019.01); *H04L 63/101* (2013.01); *H04L 67/2823* (2013.01); *H04W 12/08* (2013.01); *H04W 12/00514* (2019.01)

(58) Field of Classification Search
CPC ..... H04L 12/14; H04L 63/101; H04L 43/062; H04L 67/327; H04W 12/08; G06F 17/30864
USPC ........................................................ 709/229
See application file for complete search history.

(56) References Cited

U.S. PATENT DOCUMENTS

| 8,793,359 B1 * | 7/2014 | Fiebig ..................... H04L 67/16 709/223 |
| 8,886,750 B1 * | 11/2014 | Mutz ....................... G06F 15/16 380/277 |
| 8,954,988 B1 | 2/2015 | Laredo et al. |
| 2008/0091834 A1 * | 4/2008 | Norton ................... G06Q 10/00 709/229 |

(Continued)

*Primary Examiner* — Moustafa M Meky
*Assistant Examiner* — Elizabeth Kassa
(74) *Attorney, Agent, or Firm* — Kristofer Haggerty; Otterstedt, Wallace & Kammer, LLP

(57) ABSTRACT

To provide a client with access to an API available from a provider, a request is received from a marketplace to subscribe to the API, responsive to the client selecting the API from a catalog of the marketplace. A subscriber identifier, which is uniquely associated with the request by the client to subscribe to the selected API, is generated. An authorization record is created within a proxy; it indicates that a request by the client to invoke the API received by the proxy should be forwarded to the provider from which the API is available if the request to invoke the API includes the subscriber identifier. The generated subscriber identifier and an address of the proxy are provided to the marketplace. Thus, the client is configured to invoke the API by sending a request including the subscriber identifier to the address of the proxy.

21 Claims, 13 Drawing Sheets

(56) References Cited

U.S. PATENT DOCUMENTS

| | | | |
|---|---|---|---|
| 2011/0202589 A1* | 8/2011 | Piernot | G06F 9/546 709/202 |
| 2013/0111517 A1* | 5/2013 | Dillon | G06F 21/10 725/25 |
| 2013/0132584 A1* | 5/2013 | Palladino | H04L 65/40 709/226 |
| 2013/0132854 A1* | 5/2013 | Raleigh | G06F 3/0482 715/738 |
| 2014/0052617 A1* | 2/2014 | Chawla | G06Q 20/12 705/39 |
| 2015/0112999 A1* | 4/2015 | Sivasubramanian | G06F 9/5061 707/741 |
| 2015/0128103 A1* | 5/2015 | Stratton | G06F 8/00 717/100 |
| 2016/0019401 A1* | 1/2016 | Kumar | G06F 21/6272 726/30 |
| 2016/0134616 A1* | 5/2016 | Koushik | H04L 63/0807 726/9 |
| 2016/0352867 A1* | 12/2016 | Subbarayan | H04L 69/16 |

* cited by examiner

SYSTEM 400

SYSTEM 500

SYSTEM 600

SYSTEM 600 AND METHOD 700

SYSTEM 600 AND METHOD 700

SYSTEM 600 AND METHOD 700

FIG. 8

TABLE 810: SUBSCRIBERS

| COLUMN | DESCRIPTION |
|---|---|
| 811 — ID | SUBSCRIBER ID, PRIMARY KEY OF THE TABLE |
| 812 — MARKETPLACE | ID OF THE MARKETPLACE THE SUBSCRIBER IS FROM, FOREIGN KEY INTO THE TABLE MARKETPLACES (840) |
| 813 — API | ID OF THE TARGET API, FOREIGN KEY INTO THE TABLE APIS (820) |
| 814 — APIKEY | API KEY FOR AUTHENTICATION |
| 815 — STATUS | STATUS OF THE SUBSCRIBERS: ACTIVE, SUSPENDED, ARCHIVED, etc. |

TABLE 820: APIS

| COLUMN | DESCRIPTION |
|---|---|
| 821 — ID | API ID, PRIMARY KEY OF THE TABLE |
| 822 — PROVIDER | ID OF THE PROVIDER OF THIS API, FOREIGN KEY INTO THE TABLE PROVIDERS (830) |
| 823 — URL_BASE | THE BASE URL FOR THE API |
| INTERNAL_USERNAME 824 | USERNAME USED TO AUTHENTICATE AGAINST THE TARGET API, OPTIONAL |
| INTERNAL_PASSWORD 825 | PASSWORD (OR API KEY, etc) USED TO AUTHENTICATE AGAINST THE TARGET API, OPTIONAL |

TABLE 830: PROVIDERS

| COLUMN | DESCRIPTION |
|---|---|
| 831 — ID | PROVIDER ID, PRIMARY KEY OF THE TABLE |
| 832 — DATA | INFORMATION ABOUT THE PROVIDER |

TABLE 840: MARKETPLACES

| COLUMN | DESCRIPTION |
|---|---|
| 841 — ID | MARKETPLACE ID, PRIMARY KEY OF THE TABLE |
| 842 — DATA | INFORMATION ABOUT THE MARKETPLACE |

TABLE 850: METERING RECORDS

| COLUMN | DESCRIPTION |
|---|---|
| 851 — SUBSCRIBER | SUBSCRIBER ID, FOREIGN KEY INTO THE TABLE SUBSCRIBERS (810) |
| 852 — URL_PATH | URL PATH OF THE TARGET API, THIS MAY BE USED BY THE RATING ENGINE TO DETERMINE THE CHARGE |
| 853 — TIMESTAMP | TIME OF THE INVOCATION |

SUBSCRIBING TO AN API
1200

INVOKING AN API
1300

GENERATING METERING REPORT FOR PROVIDER 1500

GENERATING METERING REPORT FOR MARKETPLACE 1400

OFFERING APPLICATION PROGRAM INTERFACES (APIS) FOR SALE IN CLOUD MARKETPLACE

STATEMENT OF GOVERNMENT RIGHTS

Not Applicable.

CROSS-REFERENCE TO RELATED APPLICATIONS

Not Applicable.

FIELD OF THE INVENTION

The present invention relates to the electrical, electronic and computer arts, and, more particularly, to computing services such as cloud computing services and the like.

BACKGROUND OF THE INVENTION

To enable greater and easier software reuse, service providers are increasingly adopting an application program interface (API)-centric way of exposing their services to consumers. A cloud-based marketplace generally provides two functions: catalog and business support services (BSS). The marketplace allows providers to list their services (i.e., APIs) in a catalog so that customers can easily discover and consume these services. The marketplace also provides necessary billing mechanism so that providers can be paid for the services that are rendered. The actual multi-tenancy management and metering functionality are left to the service provider to implement. This can be a tedious process and is generally orthogonal to the core business competency of the service provider.

SUMMARY OF THE INVENTION

Principles of the invention provide a platform that automatically manages API access in a cloud marketplace for the service providers.

An exemplary method for providing a client with access to an API available from a provider includes: receiving from a marketplace a request to subscribe to the API, wherein the subscription request is responsive to the client selecting the API from a catalog of the marketplace; generating a subscriber identifier uniquely associated with the request by the client to subscribe to the selected API; creating an authorization record within a proxy, the authorization record indicating that a request by the client to invoke the API received by the proxy should be forwarded to the provider from which the API is available if the request to invoke the API comprises the subscriber identifier; providing the generated subscriber identifier and an address of the proxy to the marketplace, whereby the client is configured to invoke the API by sending a request comprising the subscriber identifier to the address of the proxy.

Another exemplary method for providing a client with access to an API available from a provider includes: receiving from the client a request to invoke the API; responsive to receiving the request to invoke the API, accessing a database to determine whether the client is subscribed to the API; and responsive to determining that the client is subscribed to the API: extracting metering information from the request, storing the metering information in the database, and forwarding the request to the provider.

An embodiment includes a system comprising a processor and a memory, the system implementing an application program interface (API) proxy associated with a specified API, wherein the API proxy is operative to: receive a request for invocation of the specified API from the client; extract a subscriber identifier from the request; authenticate the subscriber identifier extracted from the request; and responsive to authentication of the subscriber identifier extracted to the request, allow the request to pass through the API proxy to a provider of the specified API.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. Embodiments of the present invention advantageously address problems including: (1) How to offer a single tenant API in the inherently multi-tenant cloud marketplace (e.g. use case for a Broker); (2) How to resell the backend API service under a single user account or ID to multiple customers through a cloud marketplace (e.g., use case for a Dealer); and (3) How to offer a generic mechanism to track API accesses for purposes such as billing, auditing, metering, resource usage tracking, and/or resource management. Thus, embodiments of the present invention advantageously free the service provider from having to understand the details of the mechanics of the marketplace.

These and other features and advantages of the present invention will become apparent from the following detailed description of illustrative embodiments thereof, which is to be read in connection with the accompanying drawings.

BRIEF DESCRIPTION OF THE DRAWINGS

FIG. 8 depicts exemplary formats for tables according to an embodiment of the present invention.

DETAILED DESCRIPTION OF PREFERRED EMBODIMENTS

Figure 1:
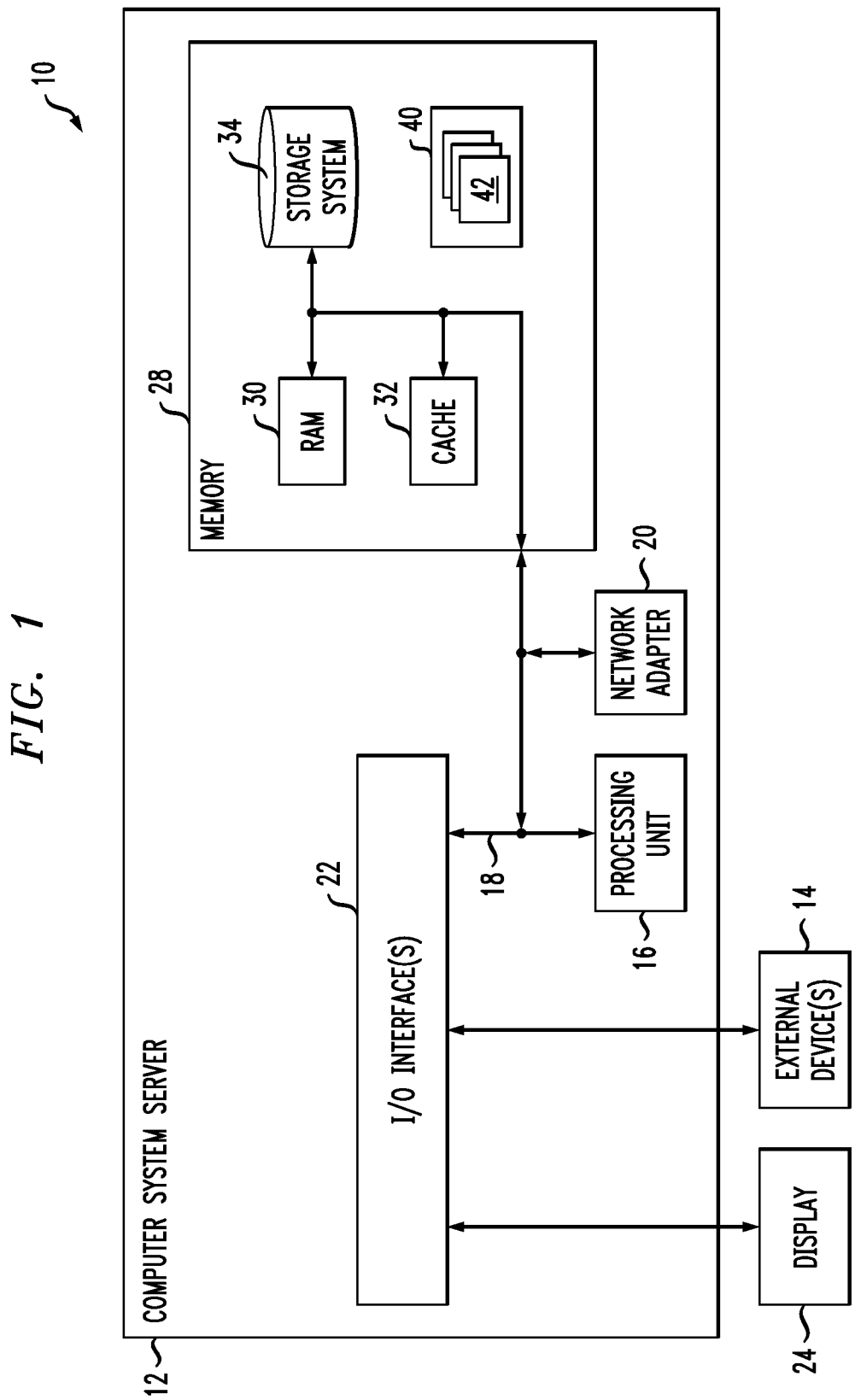
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
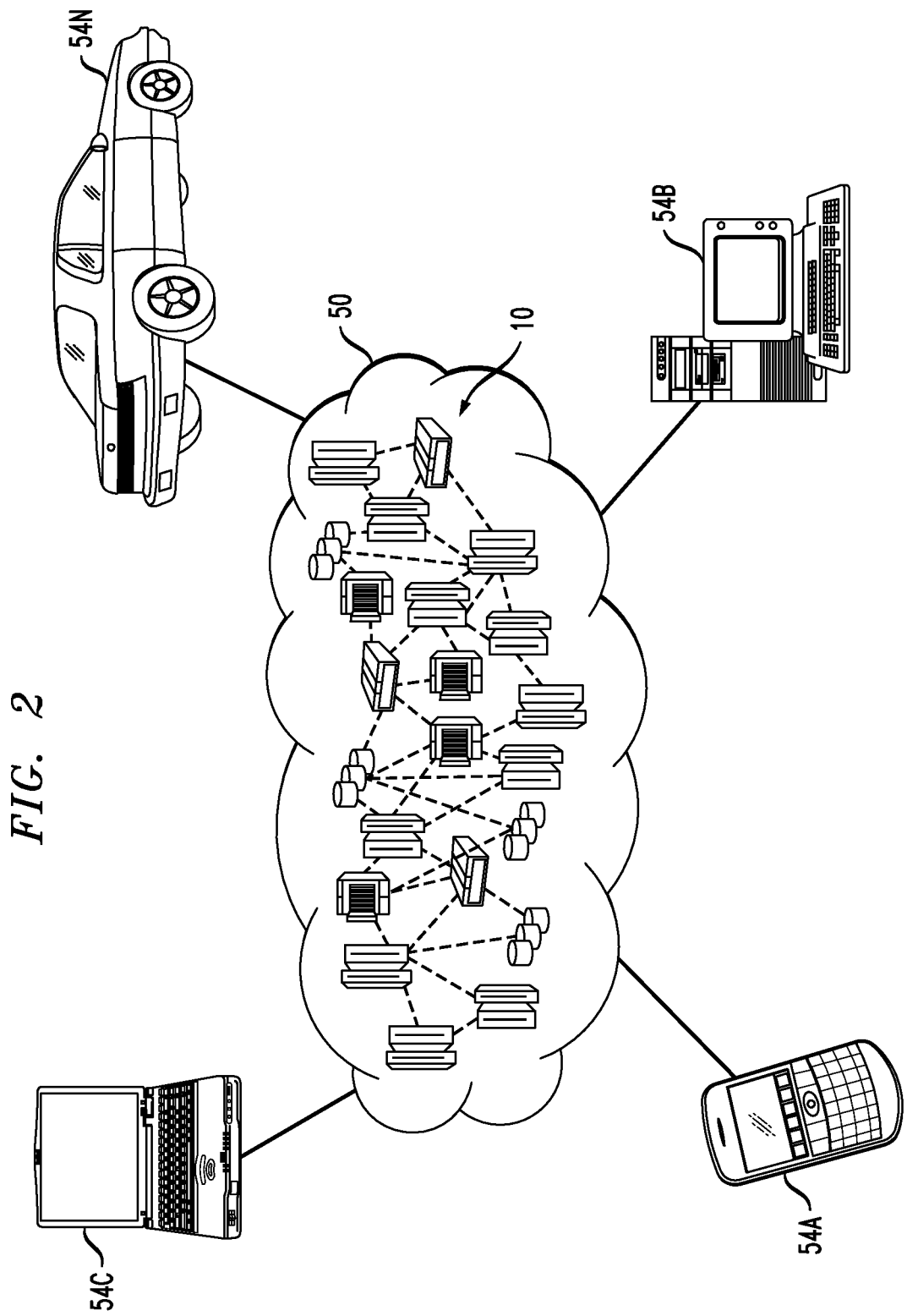
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
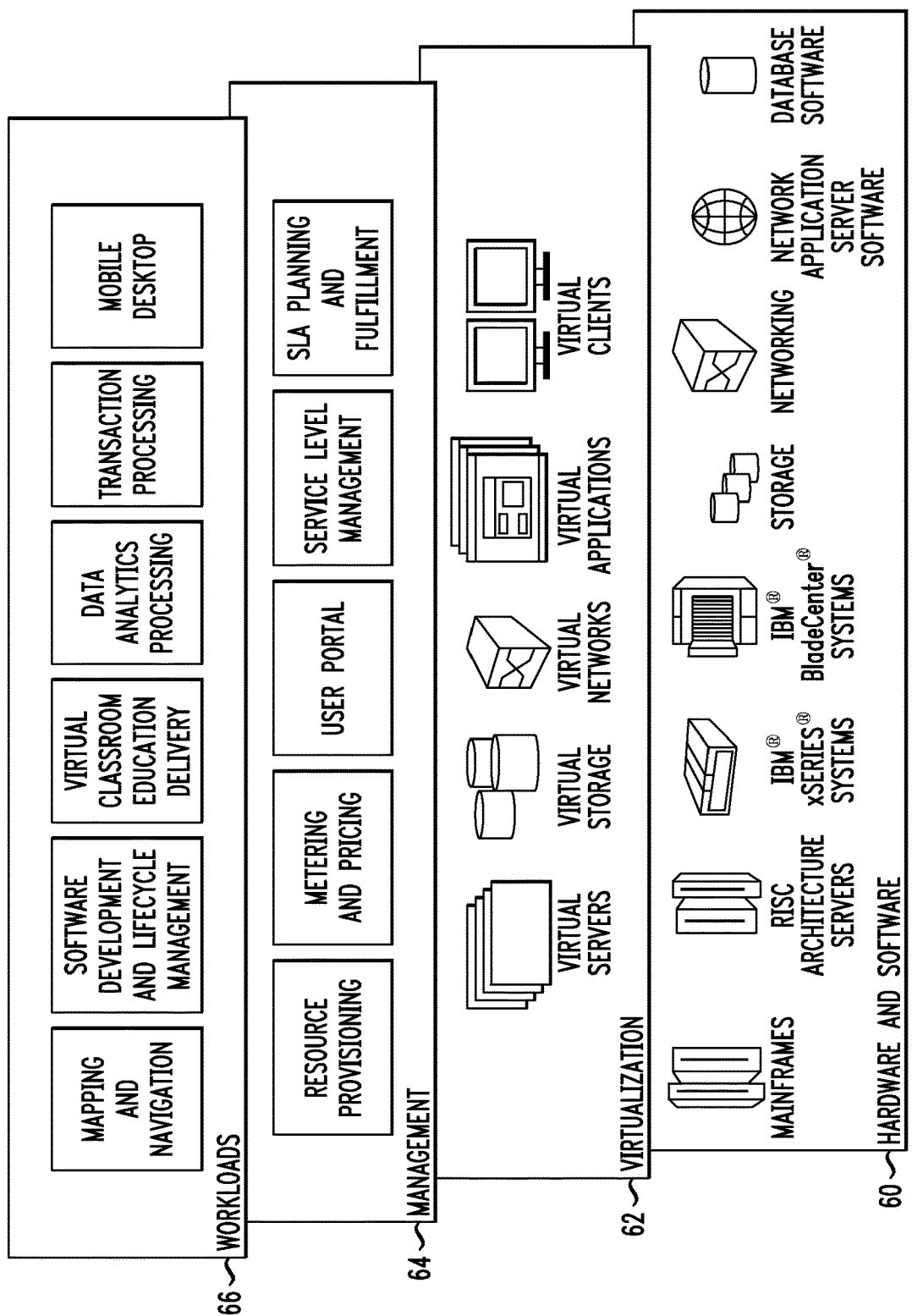
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

In one or more embodiments, the term API refers to a "Web API," or the interface between an application and a Web service running across the network. The opportunities for interposition for extension are significant for interactions over a network, as compared to other cases.

In an embodiment of the present invention, a management system manages a subscriber list, and a mapping from a marketplace user ID to a subscriber ID supports authentication and authorization. An API client calls an API proxy with the subscriber ID. Meter information is extracted and persisted by subscriber ID. The system then forwards the API call to the backend API provider. The broker provides reports of service access history, including events such as start and end of service subscriptions, to marketplaces and/or API providers either on demand or periodically, which can then be used for purposes such as billing, auditing, metering, resource usage tracking, and/or resource management.

Figure 4:
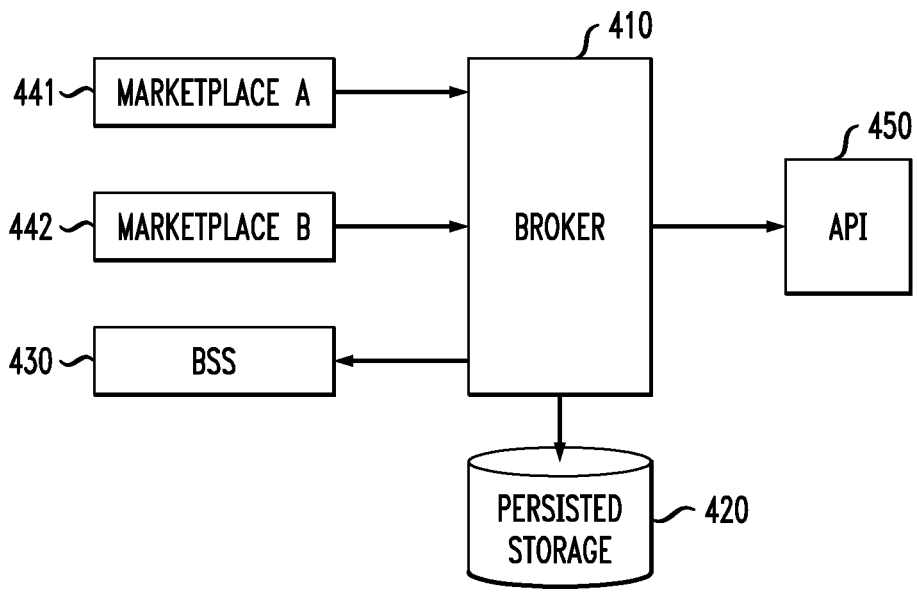
FIG. 4 depicts an exemplary system having a broker for each API.
Figure 5:
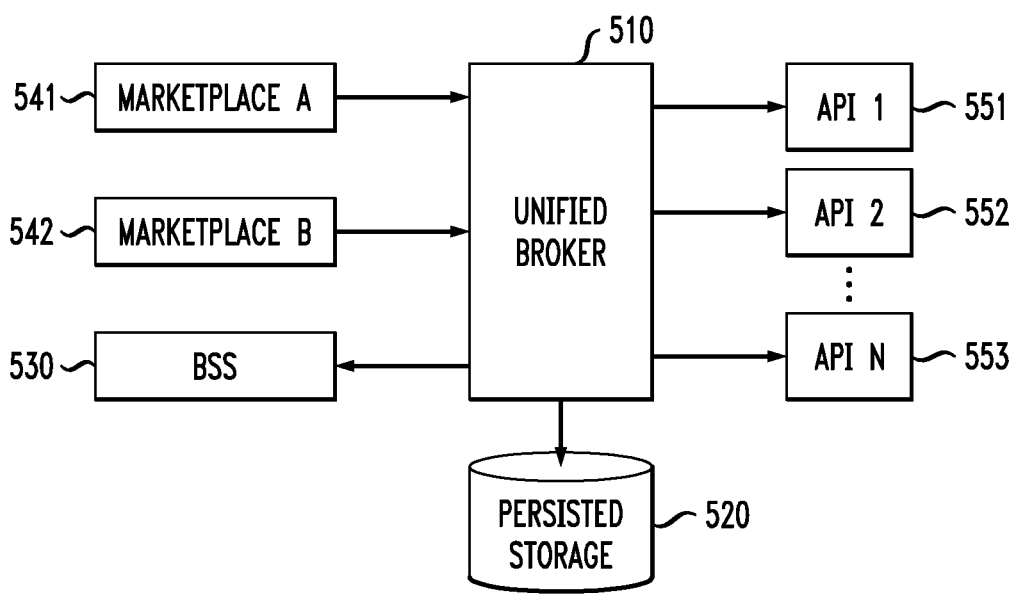
FIG. 5 depicts an exemplary system having a unified broker.

Embodiments of the present invention may be implemented, for example, using a broker for each API (as shown in FIG. 4) or using a unified broker for all APIs (as shown in FIG. 5). One skilled in the art would understand that these architectures can be combined such that some APIs use a unified broker (e.g., the architecture described with reference to system 500 in FIG. 5), while other APIs use separate brokers (e.g., the architecture described with reference to system 400 in FIG. 4).

FIG. 4 depicts an exemplary system 400 including a broker for each API. Broker 410 is a gateway for a service, and in this case is uniquely associated with a single API 450. API 450 may be, for example, a MapReduce framework implemented with InfoSphere® BigInsights™ commercially available from IBM, such as Hadoop MapReduce or Adaptive MapReduce. Of course, this is only one example of an API appropriate for use with embodiments of the present invention, as would be understood by one skilled in the art.

Broker 410 receives requests for services provided by API 450 from marketplaces, including Marketplace A 441 and Marketplace B 442. In an illustrative embodiment, Marketplace A may comprise IBM Bluemix® commercially available from IBM, while Marketplace B may comprise an AppDirect® Application Marketplace commercially available from AppDirect, Inc. of San Francisco, Calif., USA. Of course, the number and types of APIs depicted herein are purely exemplary, and embodiments of the present invention may be implementing using various numbers and types of marketplaces, as would be understood by one skilled in the art. Broker 410 forwards the aforementioned requests to API 450, which then provides the services requested and returns results to the respective marketplaces.

Broker 410 has persisted storage 420 associated therewith. Persisted storage 420 may be used to store, for example, account mapping, API access history, etc. Thus, broker 410 can use persisted storage 420 to facilitate automatic management of API user/customer accounts and API provider/development accounts. Exemplary data formats suitable for use with persisted storage 420 may include those discussed with reference to FIG. 8 herein. System 400 also includes business support services (BSS) 430, which may be responsible for operations such as billing, auditing, metering, resource usage tracking, and/or resource management. Broker 410 may prepare reports, either periodically or upon request, for delivery to BSS 430.

FIG. 5 depicts an exemplary system architecture having a unified broker. Persisted storage 520, BSS 530, and Marketplaces A 541 and B 542 are similar to the corresponding elements of FIG. 4. However, unlike broker 410 within system 400 in FIG. 4, system 500 includes unified broker 510, which is advantageously capable of processing requests for multiple APIs, shown in FIG. 5 as API 1 551, API 2 552, . . . API N 553. By way of example, API 1 551 may be a Hadoop MapReduce framework, while API 2 552 may be an Adaptive MapReduce framework, both implemented with InfoSphere® BigInsights™ commercially available from IBM. Of course, the number and types of APIs depicted herein are purely exemplary, and embodiments of the present invention may be implementing using various numbers and types of APIs, as would be understood by one skilled in the art.

Figure 6:
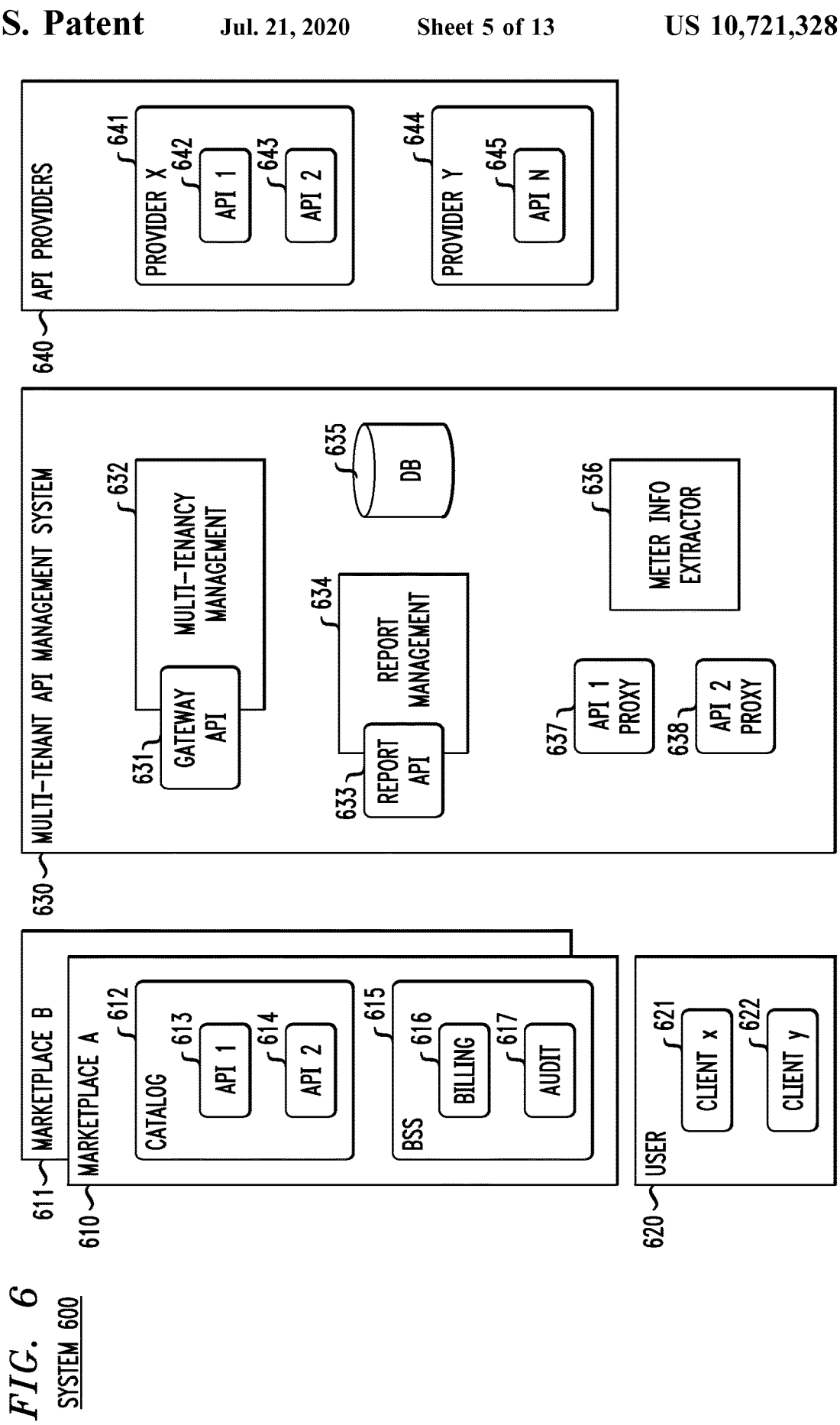
FIG. 6 depicts an exemplary system according to an embodiment of the present invention.

FIG. 6 depicts an exemplary system 600 according to an embodiment of the present invention. Although system 600 shown in FIG. 6 utilizes a unified broker similar to that discussed above with reference to FIG. 5, one skilled in the art would understand that system 600 could additionally and/or alternatively be implemented using API-specific brokers as discussed above with reference to FIG. 4, or even a hybrid architecture including both a unified broker and API-specific brokers.

System 600 includes Marketplace A 610 and Marketplace B 611. Although Marketplace B 611 is not shown in detail like Marketplace A 610, it may be implemented using a similar architecture. Marketplace A 610 and Marketplace B 611 may broadly correspond to Marketplace A and Marketplace B shown in FIG. 4 as 441 and 442 and/or in FIG. 5 as 541 and 542.

Each Marketplace may include a Catalog 612 and a BSS 615. Catalog 612 includes a listing and/or description of services available through various APIs, such as services available through API 1 613 and services available through API 2 614. These services available through API 1 613 and API 2 614 may correspond to those discussed above with reference to API 1 551 and API 2 552 in FIG. 5. However, the number and types of services depicted herein are purely exemplary, and embodiments of the present invention may be implementing using various numbers and types of services, as would be understood by one skilled in the art. As discussed above with reference to BSS 450 in FIG. 4 and BSS 550 in FIG. 5, BSS 615 in FIG. 6 may be responsible for operations such as billing, auditing, metering, resource usage tracking, and/or resource management. Thus, BSS 615 in FIG. 6 includes respective components and/or modules for billing 616 and audit 617.

System 600 also interfaces with user 620, which may include multiple clients, such as Client x 621 and Client y 622. These clients represent users who may select services from a catalog 612 within a marketplace 610 or 611, and then issue requests for provisioning of such services. Of course, the number and types of users and/or clients depicted herein are purely exemplary, and embodiments of the present invention may be implementing using various numbers and types of users and/or clients, as would be understood by one skilled in the art.

System 600 also includes API providers 640. In the exemplary embodiment shown in FIG. 6, API providers 640 include Provider X 641, which includes API 1 642 and API 2 643, and Provider Y 644, which includes API N 645. By way of example, Provider X 641 could be IBM, and more specifically InfoSphere® BigInsights™, with API 1 642 and API 2 643 respectively corresponding to a Hadoop MapReduce framework and an Adaptive MapReduce framework. Of course, the number and types of providers and APIs depicted herein are purely exemplary, and embodiments of the present invention may be implementing using various numbers and types of providers and APIs, as would be understood by one skilled in the art.

Finally, system 600 includes multi-tenant API management system 630, which may be broadly thought of as corresponding to broker 410 in FIG. 4 and/or 510 in FIG. 5. Multi-tenant API management system 630 may include a database 635, which may be broadly thought of as corresponding to persisted storage 420 in FIG. 4 and/or 520 in FIG. 5. Database 635 may include one or more of the tables depicted in FIG. 8 and described later in the present specification.

Figure 7A:
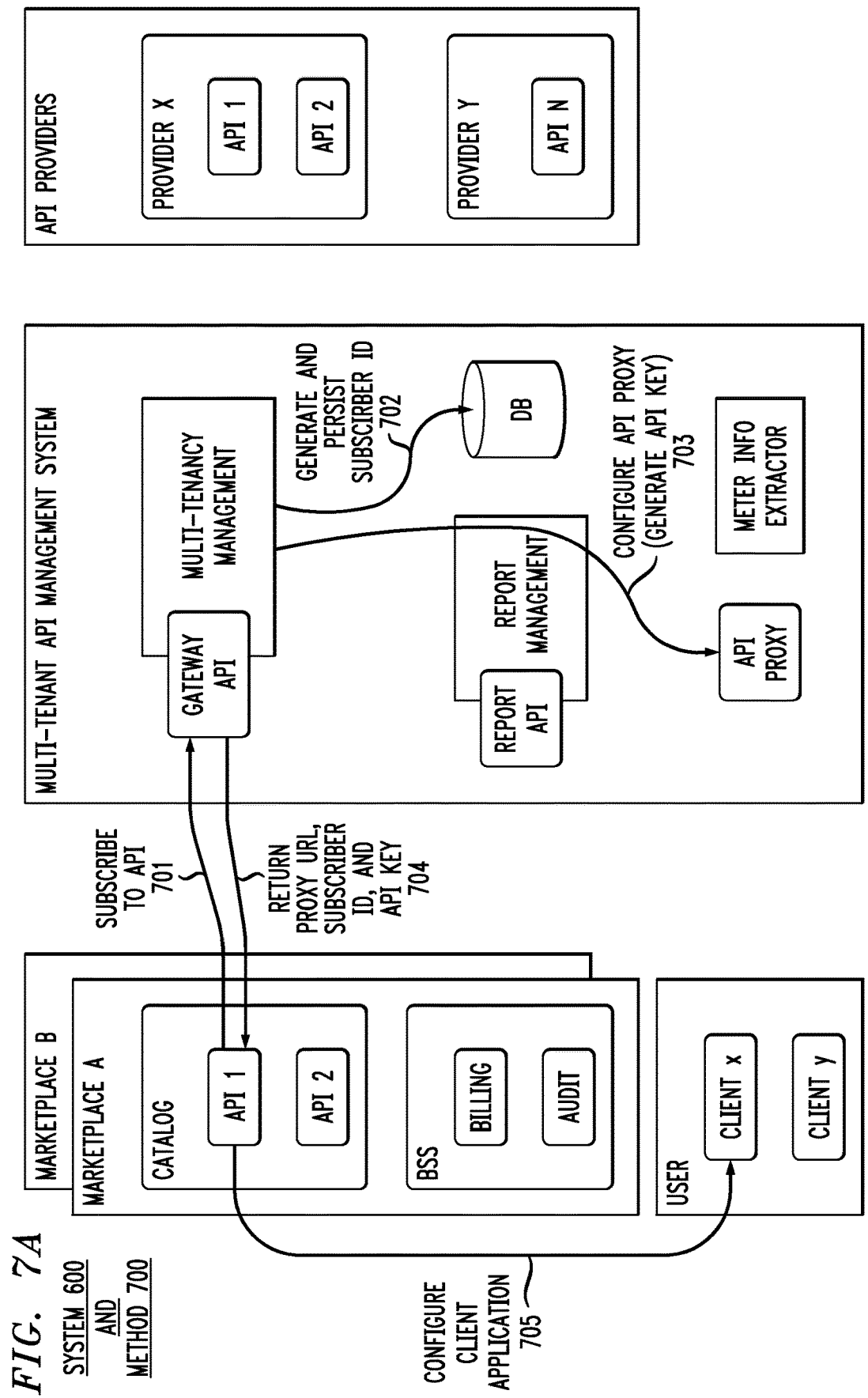
FIG. 7A depicts an exemplary process flow for API subscription creation using the system shown in FIG. 6 according to an embodiment of the present invention.
Figure 7B:
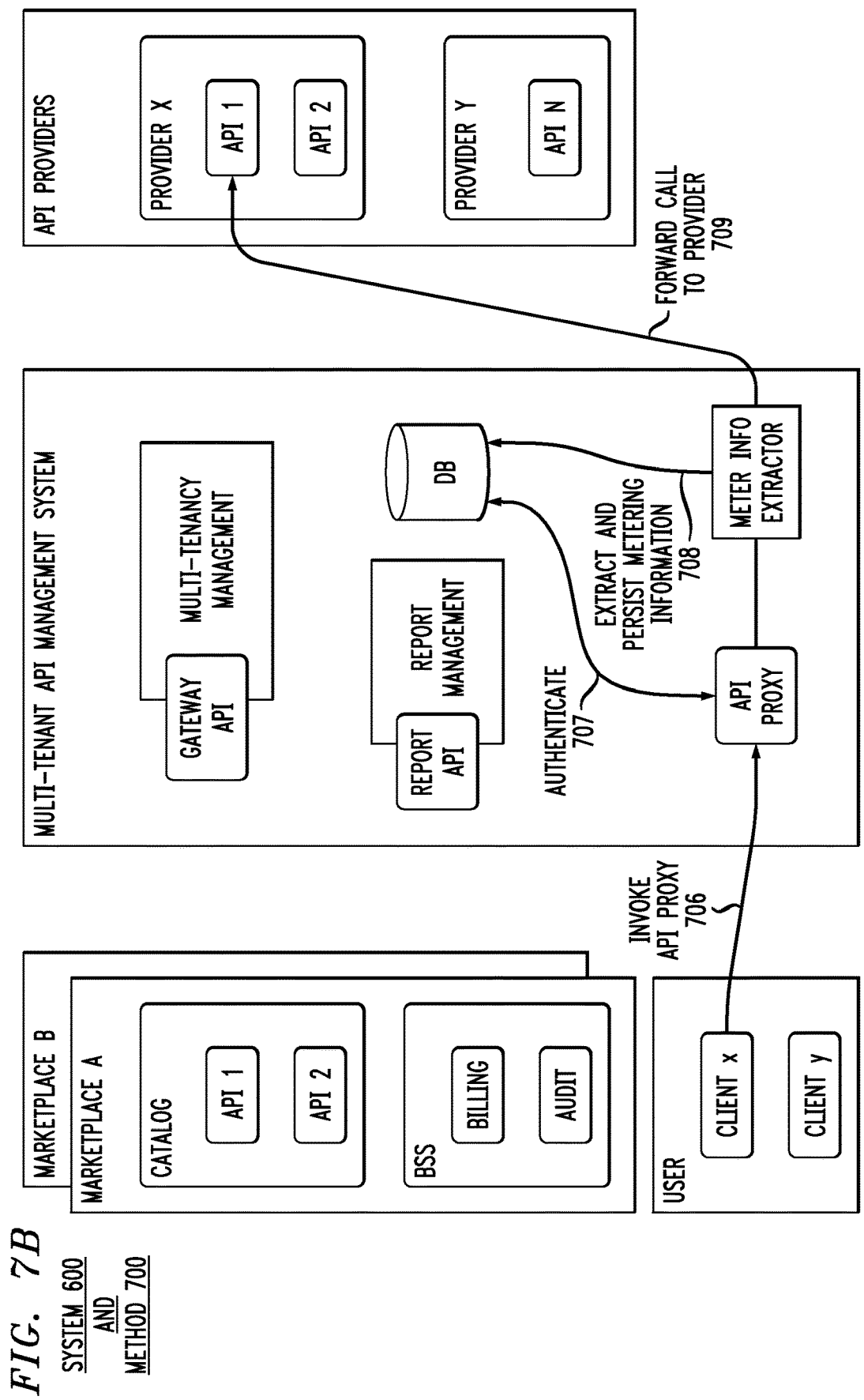
FIG. 7B depicts an exemplary process flow for API invocation using the system shown in FIG. 6 according to an embodiment of the present invention.
Figure 7C:
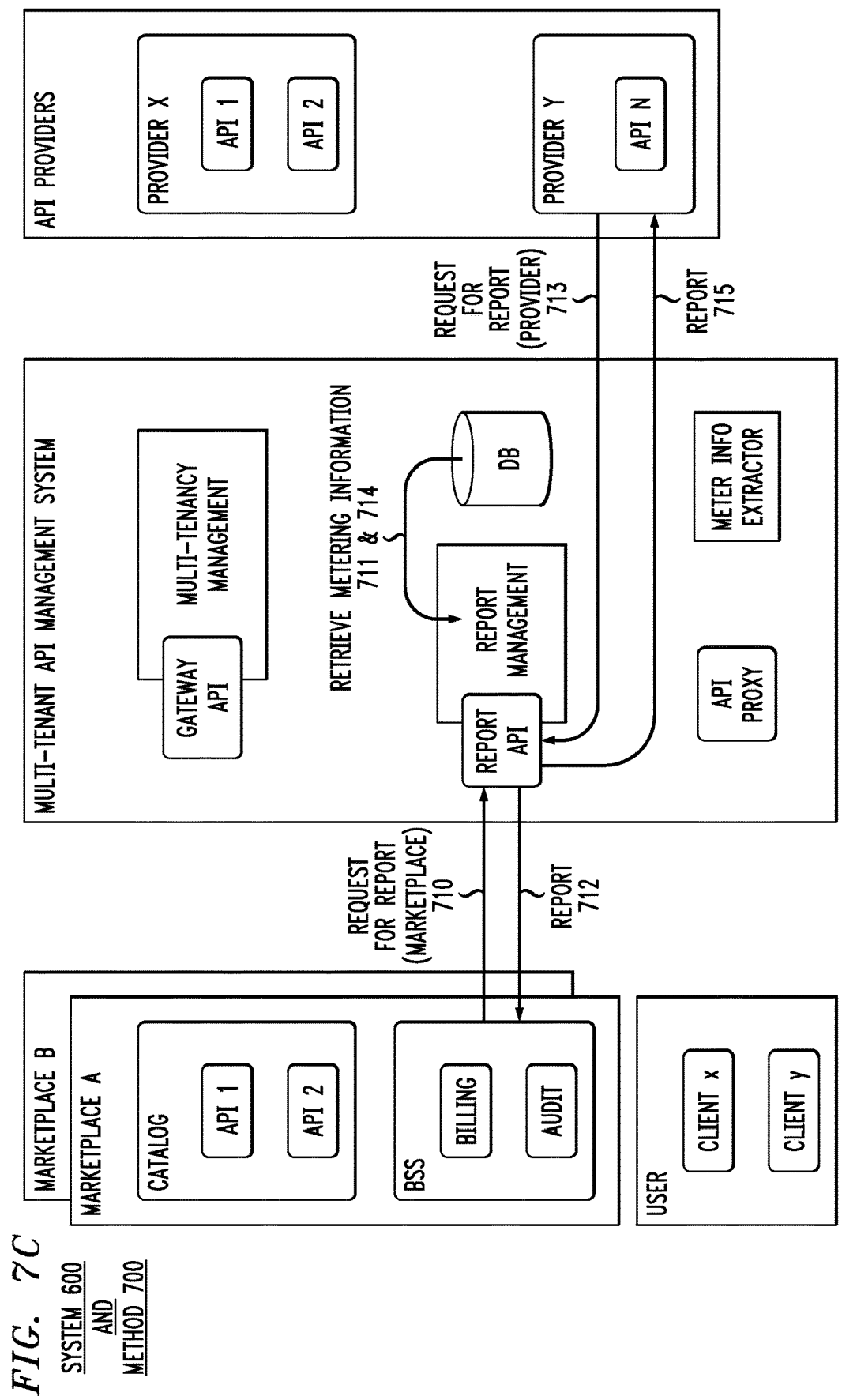
FIG. 7C depicts an exemplary process flow for generating a metering report for a marketplace and/or an API provider using the system shown in FIG. 6 according to an embodiment of the present invention.

Multi-tenant API management system 630 may include gateway API 631 coupled to multi-tenancy management component 632, report API 633 coupled to report management component 634, meter information extractor 636, and API proxies 637 and 638. Although multi-tenant API management system 630 in FIG. 6 is shown as having a plurality of API proxies corresponding to respective APIs, including API 1 proxy 637 corresponding to API 1 613 in catalog 612 and 642 in Provider X 641 and API 2 proxy 638 corresponding to API 2 614 in catalog 612 and 643 in Provider X 641, other implementations may utilize a single API proxy for all APIs (as shown in FIGS. 7A-7C), or may even implement hybrid architectures where some APIs have dedicated API proxies (e.g., API 1 proxy 637 and API 2 proxy 638 in FIG. 6) while other APIs are implemented using a shared API proxy (such as the single API proxy shown in FIGS. 7A-7C), in a manner similar to that discussed above with reference to FIGS. 4 and 5.

As will be discussed below with reference to FIG. 7A, gateway API 631 and multi-tenancy management component 632 cooperatively process incoming requests for API subscriptions received from catalog 612, with gateway API 631 serving as an interface between catalog 612 and multi-tenancy management component 632, which in turn configures API proxies 637 and/or 638 and database 635 in response to requests for subscription from catalog 612. As will be discussed below with reference to FIG. 7B, meter information extractor 636 and API proxies 637 and/or 638 cooperatively process incoming requests for API invocations received from users 620 and/or clients 621 and 622, with API proxies 637 and/or 638 serving as an interface between the aforementioned users/clients and meter information extractor 636, as well as other components inside and outside of multi-tenant API management system 630, including but not limited to API providers 640. As will be discussed below with reference to FIG. 7C, report API 633 and report management component 634 cooperatively process incoming requests for reports from BSS 615 within marketplace 610 or 611 or from API providers 640, with report API 633 serving as an interface between the requester of the report (e.g., BSS 615 or API providers 640) and report management component 634, which in turn interfaces with database 635.

Illustrative embodiments incorporating inventive aspects of system 600 shown in FIG. 6 advantageously address several problems associated with conventional arrangements. For example, illustrative embodiments advantageously facilitate the offering of a single tenant API in an inherently multi-tenant cloud marketplace (e.g., the use case for a broker) by providing a multi-tenancy management component (e.g., 632 in FIG. 6) which exposes a set of general gateway APIs (e.g., 631 in FIG. 6) that marketplaces (e.g., 610 and 611 in FIG. 6) can invoke to carry out product lifestyle management. The multi-tenancy management component (e.g., 632 in FIG. 6) maintains a list of subscriber IDs (e.g., in database 635 in FIG. 6) for each backend API (e.g., 642, 643 and 645 in FIG. 6), and also manages one or more API proxies (e.g., 637 and 638 in FIG. 6) for accessing the backend APIs. The one or more API proxies, in some embodiments, are also operable to automatically manage API user/customer accounts and API provider/developer accounts.

Illustrative embodiments also advantageously facilitate the reselling of backend API service under a single user account/ID to multiple customers through a marketplace (e.g., the user case for a dealer) because the one or more API proxies (e.g., 637 and 638 in FIG. 6) are exposed to end consumer client programs (e.g., 620, 621 and 622 in FIG. 6) such that any API invocations (or "calls") are intercepted by a meter information extractor (e.g., 636 in FIG. 6), which determines the subscriber ID, records meter information in a database (e.g., 635 in FIG. 6), then forwards each API invocation to the correct backend API. For example, in an embodiment of system 600 in FIG. 6, invocations of API 1, designated as 613 in catalog 612, are forwarded to 642 in provider 641, while invocations of API 2, designated as 614 in catalog 612, are forwarded to 643 in provider 641. Illustrative embodiments further facilitate offering a generic mechanism to track API accesses for purposes such as billing, auditing, metering, resource usage tracking, and/or resource management by providing a report generator, comprising report API 633 and report management component 634, which advantageously provides reports of service access history, including events such as start and end of service subscription, to marketplaces and/or API providers either periodically or on demand.

FIGS. 7A-7C depict a process flow showing implementation of a method 700 using system 600. Although FIGS. 7A-7C depicts each of the elements of system 600 as shown in FIG. 6, the reference numerals associated with these elements have omitted solely to improve legibility and to reiterate that FIGS. 7A-7C are intended primarily to illustrate the steps associated with method 700. Also, as mentioned above, FIGS. 7A-7C show an arrangement with a single shared API proxy rather than a separate API 1 proxy 637 and API 2 proxy 638 shown in FIG. 6. Of course, it should be understood by one skilled in the art that method 700 may be implemented using systems other than that shown in FIG. 6 (including, but not limited to, the systems shown in FIG. 4 and/or FIG. 5), and that system 600 may be operable to implement additional and/or alternative techniques besides the specific method 700 shown in FIGS. 7A-7C (including, but not limited to, the techniques shown in FIGS. 9-15).

Moreover, although method 700 could be implemented in its entirety as a unitary method, method 700 could also be conceptualized as comprising several distinct techniques which address different problems relating to service provider management of API access in a cloud marketplace. Before discussing each of the techniques shown in FIGS. 7A-7C in detail, the next several paragraphs will briefly describe the manner in which these techniques are distinct yet related.

FIG. 7A depicts an exemplary process flow for API subscription creation, comprising steps 701 through 705 of method 700, implemented using system 600 shown in FIG. 6. Additional details regarding API subscription creation according to embodiments of the present invention are described with reference to FIG. 12. Embodiments of the techniques for API subscription creation described with reference to FIG. 7A and FIG. 12 may be thought of as representative of a use case associated with a broker, and advantageously address the problem of how to offer a single tenant API in an inherently multi-tenant cloud marketplace by providing a management system which manages a subscriber list, such that the mapping from a marketplace user ID to a subscriber ID supports authentication and authorization.

Figure 12:
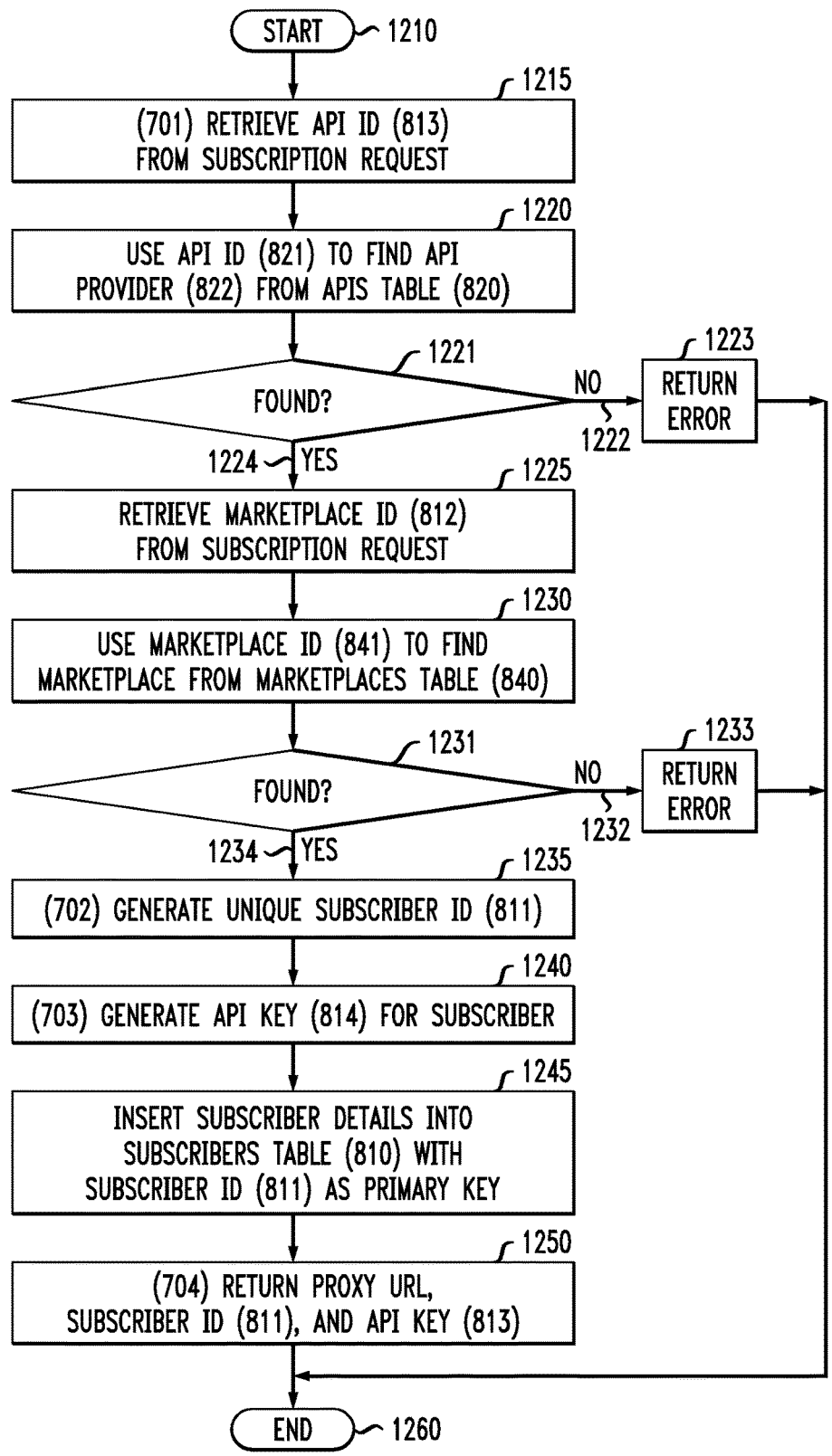
FIG. 12 is a flow chart depicting an exemplary method for subscribing to an API according to an embodiment of the present invention.

FIG. 7B depicts an exemplary process flow for API invocation (e.g., of an API for which a subscription has been created using the steps shown in FIG. 7A and/or FIG. 12), comprising steps 706 through 709 of method 700, as implemented using system 600 shown in FIG. 6. Additional details regarding API invocation according to embodiments of the present invention are described with reference to FIG. 13. Embodiments of the techniques for API invocation described with reference to FIG. 7A and FIG. 13 may be thought of as representative of a use case associated with a dealer, and advantageously address the problem of how to resell a backend API service under a single user account or ID to multiple customers through a cloud marketplace by providing techniques in which: an API client calls an API proxy with the subscriber ID, meter information is extracted and persisted by subscriber ID, then the API call is forwarded to the backend API provider.

FIG. 7C depicts exemplary process flow(s) for generating reports regarding usage of APIs (e.g., tracking APIs invoked using the steps shown in FIG. 7B and/or FIG. 13), comprising steps 710 through 715 of method 700, as implemented using system 600 shown in FIG. 6. Embodiments of the techniques for generating metering reports shown in FIG. 7C, as well as FIGS. 14 and 15, advantageously address the problem of how to offer a generic mechanism to track API accesses for purposes such as billing, auditing, metering, resource usage tracking, and/or resource management by allowing a broker to provide reports of service access history, including events such as start and end of service subscription, to a marketplace and/or an API provider periodically and/or on demand.

Figure 15:
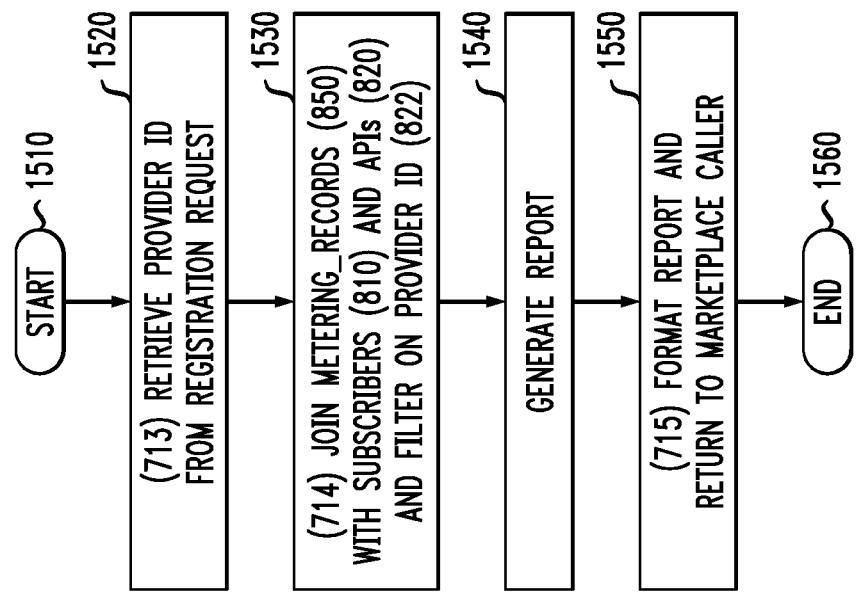
FIG. 15 is a flow chart depicting an exemplary method for generating a metering report for a provider according to an embodiment of the present invention.
Figure 14:
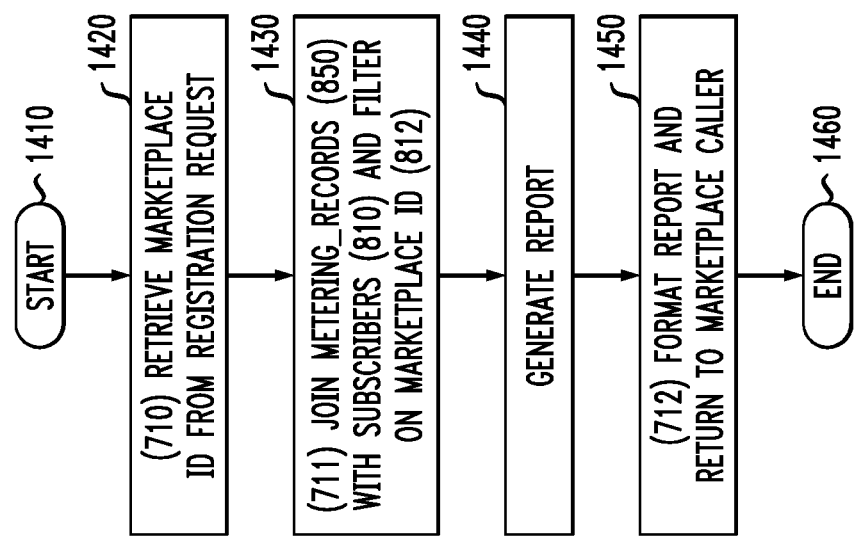
FIG. 14 is a flow chart depicting an exemplary method for generating a metering report for a marketplace according to an embodiment of the present invention.

However, FIG. 7C may also be considered to disclose a plurality of related, but distinct and independently-implementable, methods: a method for preparing a report for a marketplace, comprising steps 710 through 712 of method 700, and a method for preparing a report for a provider, comprising steps 713 through 715 of method 700. Similarly, FIG. 14 depicts a method for generating metering reports for a marketplace, broadly analogous to steps 710 through 712 of method 700, while FIG. 15 depicts a method for generating metering reports for a provider, broadly analogous to steps 713 through 715 of method 700.

FIG. 7A depicts an exemplary process flow for API subscription creation, comprising steps 701 through 705 of method 700, as implemented using system 600 shown in FIG. 6. As previously noted, FIG. 12 also shows a method for API subscription creation. The processes shown in FIG. 7A and in FIG. 12 each begin when a consumer (e.g., client X 621 in FIG. 6) browses a catalog (e.g., catalog 612) of a marketplace (e.g., marketplace A 610 in FIG. 6) and selects a listing and/or description of an API of interest (e.g., API 1, shown as 613 within catalog 612). The consumer uses the marketplace's purchasing facility to purchase a subscription to the selected API, and in step 701 of method 700 shown in FIG. 7A, the marketplace invokes a gateway API (e.g., 631 shown in FIG. 6) to a multi-tenancy management component (e.g., 632 shown in FIG. 6) within a multi-tenant API management system (e.g., 630 shown in FIG. 6). Further details regarding an exemplary technique useful in connection with step 701 in method 700 shown in FIG. 7A are described reference to steps 1215 through 1234 shown in FIG. 12.

In step 702 of method 700 shown in FIG. 7A, the multi-tenancy management component (e.g., 632 in FIG. 6) generates a uniquely identifying subscriber ID for the subscription request, associates this subscriber ID with the selected API, and persists (i.e., stores) this information in a database (e.g., 635 in FIG. 6). An exemplary technique for performing step 702 of method 700 shown in FIG. 7A is described in greater detail with reference to steps 1235 through 1245 shown in FIG. 12.

In step 703 of method 700 shown in FIG. 7A, the multi-tenancy management component (e.g., 632 in FIG. 6) configures an API proxy for the selected API (e.g., API 1 proxy 637 in FIG. 6 or the single API proxy shown in FIG. 7A). Step 703 may include creating an appropriate authorization record for the API proxy, which may include generating an API key, to ensure that future invocations of the selected API with the subscriber ID created in step 702 are allowed to pass through. An exemplary technique for performing step 702 in method 700 is described in greater detail with reference to steps 1240 through 1245 shown in FIG. 12.

In step 704 of method 700 shown in FIG. 7A, the aforementioned subscriber ID, the address (e.g., uniform resource locator or URL) of the API proxy (e.g., API 1 proxy 637 shown in FIG. 6), and/or an API key are returned to the marketplace. In an embodiment shown in FIG. 7A, with reference to system 600 in FIG. 6, multi-tenancy management component 632 uses gateway API 631 to return this information to API 1 613 within catalog 612 of marketplace A 610. See also step 1250 shown in FIG. 12.

In step 705 of method 700 shown in FIG. 7A, the marketplace can optionally use its native mechanism to communicate this information to the consumer. For example, in the illustrative embodiment shown in FIG. 7A, API 1 613 within catalog 612 of marketplace A 610 shown in FIG. 6 receives information from gateway API 631 which it then transmits to Client x 621. The consumer (e.g., Client x 621 shown in FIG. 6) can then use this information to configure client programs. This configuration process could be automatic or manual, depending on the specific capabilities of the consumer's client programs and associated maintenance utilities.

FIG. 7B depicts an exemplary process flow for API invocation (e.g., of an API for which a subscription has been created using the steps shown in FIG. 7A and/or FIG. 12), comprising steps 706 through 709 of method 700, as implemented using system 600 shown in FIG. 6. Additional details regarding API invocation according to embodiments of the present invention are described with reference to FIG. 13. In step 706 of method 700 shown in FIG. 7B, a client program (e.g., Client x 621 shown in FIG. 6) sends a request for invocation of an API (e.g., API 1, shown in FIG. 6 as 613 in catalog 612 and as 642 in provider X 641) to an API proxy (e.g., API 1 proxy 637 shown in FIG. 6). The client's invocation request includes the subscriber ID, for example, as an HTTP (HyperText Transport Protocol) authentication header, embedded in the proxy URL path, or as a URL parameter. See also step 1315 shown in FIG. 13.

In step 707 of method 700 shown in FIG. 7B, the API proxy (e.g., API 1 proxy 637 in FIG. 6) extracts the subscriber ID from the invocation request and authenticates it (for example, using database 635 in FIG. 6, as in the exemplary techniques discussed with reference to steps 1320 to 1324 in FIG. 13). If the user is authorized, then in step 708 of method 700 shown in FIG. 7B, the invocation request (also known as an API call) goes through the meter information extractor (e.g., 636 shown in FIG. 6), which creates a usage record (e.g., within database 635 shown in FIG. 6 and/or persisted storage shown as 420 in FIG. 4 or 520 in FIG. 5). See also step 1345 in FIG. 13.

In step 709 of method 700 shown in FIG. 7B, the invocation request (i.e., API call) is forwarded (e.g., by meter information extractor 636 within multi-tenant API management system 630 shown in FIG. 6) to the actual backend API (e.g., API 1 642 within provider X 641) and results are returned to the calling client program. Further details regarding an exemplary technique useful for performing step 709 of method 700 shown in FIG. 7B are described with reference to steps 1325 through 1340, 1350 and 1355 shown in FIG. 13.

FIG. 7C depicts exemplary process flow(s) for generating reports regarding usage of APIs (e.g., tracking APIs invoked using the steps shown in FIG. 7B and/or FIG. 13), comprising steps 710 through 715 of method 700, as implemented using system 600 shown in FIG. 6. Broadly speaking, FIGS. 6 and 7C disclose arrangements in which a report management component (e.g., 634 shown in FIG. 6) exposes its service through a report API (e.g., 633 shown in FIG. 6), and this service can then be requested by interested external systems, such as an API provider (e.g., 641 or 644 within 640 of FIG. 6) and/or a marketplace (e.g., 610 in FIG. 6, and more particularly BSS 615 therein).

However, FIG. 7C may be considered to disclose a plurality of related, but distinct and independently-implementable, methods: a method for preparing a report for a marketplace, comprising steps 710 through 712 of method 700, and also a method for preparing a report for a provider, comprising steps 713 through 715 of method 700. Similarly, FIG. 14 depicts a method for generating metering reports for a marketplace (e.g., 610 or 611 in FIG. 6), broadly analogous to steps 710 through 712 of method 700, while FIG. 15 depicts a method for generating metering reports for an API provider (e.g., 641 or 644 in FIG. 6), broadly analogous to steps 713 through 715 of method 700.

Turning first to the method for preparing a report for a marketplace comprising steps 710 through 712 of method 700 shown in FIG. 7C, corresponding generally to FIG. 14, in step 710, a marketplace (e.g., 610 shown in FIG. 6), and more particularly a BSS component thereof (e.g., 615 shown in FIG. 6), requests a metering report from a report API (e.g., 633 shown in FIG. 6). See also step 1420 in FIG. 14.

In step 711 of method 700 shown in FIG. 7C, a report management component (e.g., 634 shown in FIG. 6) queries a database (e.g., 635 shown in FIG. 6) for all usage records and creates a usage report for each authorized user of any given API. Further details regarding an exemplary technique useful for performing step 711 of method 700 shown in FIG. 7C are described with reference to steps 1420 through 1440 shown in FIG. 14.

In step 712 of method 700 shown in FIG. 7C, the report is returned by report API (e.g., 633 shown in FIG. 6) to the requesting marketplace (e.g., marketplace A 610, and more particularly BSS 615, shown in FIG. 6). See also step 1450 in FIG. 14. The marketplace may optionally supplement the report with rating rules to create actual invoices for the customers, or the report may be used in connection with a security audit.

Turning next to the method for preparing a report for a marketplace comprising steps 713 through 715 of method 700 shown in FIG. 7C, which corresponds generally to FIG. 15, in step 713, an API provider (e.g., provider Y 641 shown in FIG. 6) requests a metering report from a report API (e.g., 633 shown in FIG. 6). See also step 1520 in FIG. 15.

In step 714 of method 700 shown in FIG. 7C, a report management component (e.g., 634 shown in FIG. 6) queries a database (e.g., 635 shown in FIG. 6) for all usage records and creates a usage report for each authorized user of all APIs associated with the requesting provider. Further details regarding an exemplary technique useful for performing step 713 of method 700 shown in FIG. 7C are described with reference to steps 1520 through 1540 shown in FIG. 15. In step 715 of method 700 shown in FIG. 7C, the report is returned by report API (e.g., 633 shown in FIG. 6) to the requesting provider (e.g., provider Y 641 shown in FIG. 6).

FIG. 8 depicts exemplary formats for tables according to an embodiment of the present invention. In illustrative embodiments, one or more of the five tables shown in FIG. 8 may be stored within database 635 shown in FIG. 6 and/or persisted storage shown as 420 in FIG. 4 or 520 in FIG. 5. Table 810 is entitled SUBSCRIBERS and includes column 811, which is entitled ID and which contains the subscriber ID and serves as the primary key for table 810; column 812, entitled MARKETPLACE, which contains the ID of the marketplace the subscriber is from and serves as a foreign key into the table MARKETPLACES (840 in FIG. 8); column 813, entitled API, which includes the ID of the target API and is a foreign key into the table APIS (820 in FIG. 8), column 814, entitled APIKEY, which contains an API key for authentication; and column 815, entitled STATUS, which indicates the status of the subscriber, such as active, suspending, archived, etc.

Table 820 is entitled APIS and includes column 821, which is entitled ID and which contains the API ID and serves as the primary key for table 820; column 822, which is entitled PROVIDER and which contains the ID of the provider of the API and serves as a foreign key into the table PROVIDERS (830 in FIG. 8); column 823, which is entitled URL_BASE and which contains the base URL for the API; column 824, which is entitled INTERNAL_USERNAME and which contains the username used to against the target API; and column 825, which is entitled INTERNAL_PASSWORD and which contains the password (or API key, etc.) used to authenticate against the target API. Within table 820, column 824 (INTERNAL_USERNAME) and column 825 (INTERNAL_PASSWORD) are explicitly designated as optional.

Table 830 is entitled PROVIDERS and includes column 831, which is entitled ID and which contains the provider ID and serves as the primary key of table 830, and column 832, which is entitled DATA and contains information about the provider. Table 840 is entitled MARKETPLACES and includes column 841, which is entitled ID and which contains the marketplace ID and serves as the primary key of table 840, and column 842, which is entitled DATA and contains information about the marketplace. Table 850 is entitled METERING_RECORDS and includes column 851, which is entitled SUBSCRIBER and which contains the subscriber ID and serves as a foreign key into the table SUBSCRIBERS 810; column 852, which is entitled URL_PATH, contains the URL path of the target API, and may be used by a rating engine to determine a charge (e.g., fee); and column 853, which is entitled TIMESTAMP and contains the time of the invocation.

Figure 9:
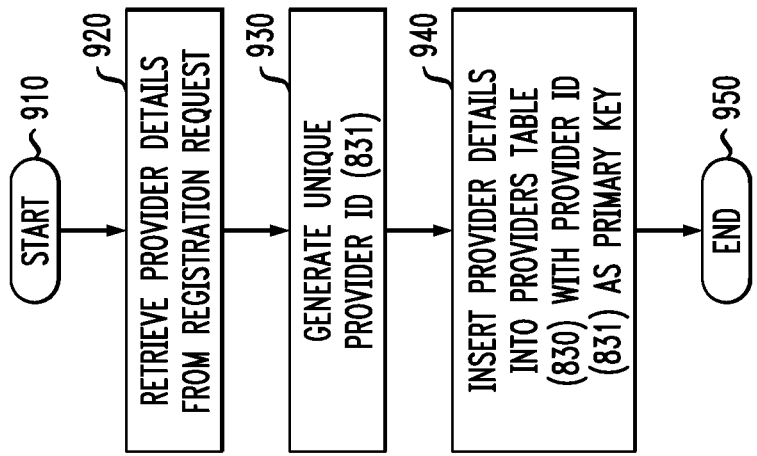
FIG. 9 is a flow chart depicting an exemplary method for registering an API provider according to an embodiment of the present invention.

FIG. 9 is a flow chart depicting an exemplary method 900 for registering an API provider (e.g., provider X 641 or provider Y 644 in FIG. 6). Method 900 starts at step 910. In step 920, provider details are retrieved from the registration request. The registration request may include the provider details, for example, as an HTTP authentication header, embedded in the proxy URL path, or as a URL parameter. In step 930, a unique provider ID (e.g., 831 in FIG. 8) is generated. In step 940, provider details are inserted into the PROVIDERS table (e.g., 830 in FIG. 8) with the provider ID (e.g., 831 in FIG. 8) generated in step 930 as the primary key. Method 900 ends at step 950.

Figure 10:
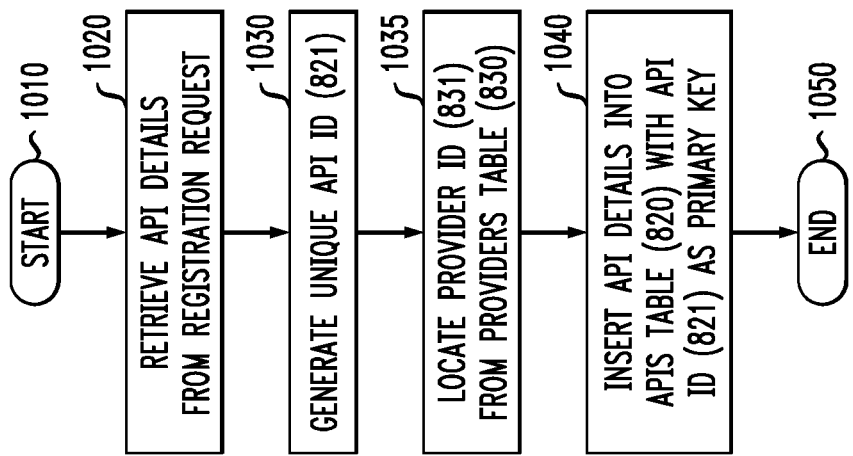
FIG. 10 is a flow chart depicting an exemplary method for registering an API according to an embodiment of the present invention.

FIG. 10 is a flow chart depicting an exemplary method 1000 for registering an API (e.g., in FIG. 6, API 1 642 or API 2 643 associated with provider X 641 or API N associated with provider Y 644). Method 1000 starts at step 1010. In step 1020, API details are retrieved from the registration request. The registration request may include the API details, for example, as an HTTP authentication header, embedded in the proxy URL path, or as a URL parameter. In step 1030, a unique API ID (e.g., 821 in FIG. 8) is generated. In step 1035, the provider ID (e.g., 831 in FIG. 8) is located from the PROVIDERS table (e.g., 830 in FIG. 8). This suggests that the API provider should be registered (e.g., using method 900 in FIG. 9) before the API can be registered (e.g., using method 1000 in FIG. 10). In step 1040, the API details are inserted into the APIS table (e.g., 820 in FIG. 8) with the API ID (e.g., 821 in FIG. 8) generated in step 1030 as the primary key. The API details inserted into the APIS table (e.g., 820 in FIG. 8) in step 1040 also include the provider ID (e.g., 822 in APIS table 820 in FIGS. 8 and 831 in PROVIDERS table 830 in FIG. 8) which located from the PROVIDERS table (e.g., 830 in FIG. 8) in step 1035. Method 1000 ends at step 1050.

Figure 11:
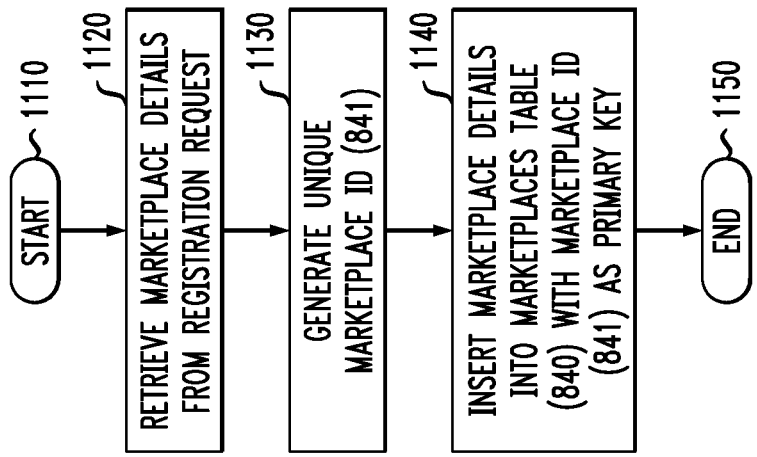
FIG. 11 is a flow chart depicting an exemplary method for registering a marketplace according to an embodiment of the present invention.

FIG. 11 is a flow chart depicting an exemplary method 1100 for registering a marketplace (e.g., marketplace A 610 or marketplace 611 in FIG. 6). Method 1100 starts at step 1110. In step 1120, marketplace details are retrieved from the registration request. The registration request may include the marketplace details, for example, as an HTTP authentication header, embedded in the proxy URL path, or as a URL parameter. In step 1130, a unique provider ID (e.g., 841 in FIG. 8) is generated. In step 940, provider details are inserted into the MARKETPLACES table (e.g., 840 in FIG. 8) with the marketplace ID (e.g., 841 in FIG. 8) generated in step 1130 as the primary key. Method 1100 ends at step 1150.

FIG. 12 is a flow chart depicting an exemplary method 1200 for subscribing to an API. Another method for subscribing to an API was described above with reference to steps 701 through 705 of method 700 shown in FIG. 7A. Method 1200 starts at step 1210. In step 1215, the API ID (e.g., 813 in FIG. 8) is retrieved from a subscription request. The subscription request may include the API ID, for example, as an HTTP authentication header, embedded in the proxy URL path, or as a URL parameter. See also the preceding discussion with reference to step 701 in FIG. 7A.

Step 1220 attempts to use the API ID retrieved from the subscription request (e.g., 813 in FIG. 8) as a primary key (e.g., 821 in FIG. 8) within APIS table (e.g., 820 in FIG. 8) to find the API provider (e.g., 822 in FIG. 8). Decision block 1221 tests to see whether step 1220 successfully found the API provider within the APIS table using as a primary key the API ID retrieved from the subscription request in step 1215. If not (branch 1222), then an error is returned in step 1223 and the method ends in step 1260.

If the API provider was found within the APIS table in step 1220 (branch 1224), the method continues to step 1225 where MARKETPLACE ID (e.g., 812 in FIG. 8) is retrieved from the subscription request. Step 1230 attempts to use the MARKETPLACE ID retrieved from the subscription request (e.g., 812 in FIG. 8) as a primary key (e.g., 841 in FIG. 8) to find the marketplace within MARKETPLACES table (e.g., 840 in FIG. 8). Decision block 1231 tests to see whether step 1230 successfully found the marketplace within the MARKETPLACES table using as a primary key the MARKETPLACE ID retrieved from the subscription request in step 1225. If not (branch 1232), then an error is returned in step 1233 and the method ends in step 1260.

If the marketplace was found within the MARKETPLACES table in step 1230 (branch 1234), the method continues to step 1235 where a unique subscriber ID (e.g., 811 in FIG. 8) is generated. See the preceding discussion with reference to step 702 in FIG. 7A. In step 1240, an API key (e.g., 814 in FIG. 8) is generated for the subscriber. See the preceding discussion with reference to step 703 of method 700 shown in FIG. 7A. In step 1245, subscriber details are inserted into the SUBSCRIBERS table (e.g., 810 in FIG. 8) with the subscriber ID (e.g., 811 in FIG. 8) generated in step 1235 as primary key. Note that the subscriber details inserted into the SUBSCRIBERS table (e.g., 810 in FIG. 8) in step 1245 will also include the API ID (e.g., 813 in FIG. 8) and marketplace ID (e.g., 812 in FIG. 8) retrieved from the subscription request in steps 1215 and 1225, and verified in steps 1220 and 1230, respectively, as well as the API key (e.g., 814 in FIG. 8) generated in step 1240. In step 1250, the subscriber ID and API key respectively generated in steps 1235 and 1240 are returned, as well as the address (e.g., URL) of the proxy for the API, as discussed above with reference to step 704 of method 700 shown in FIG. 7A. Method 1200 ends at step 1260.

Figure 13:
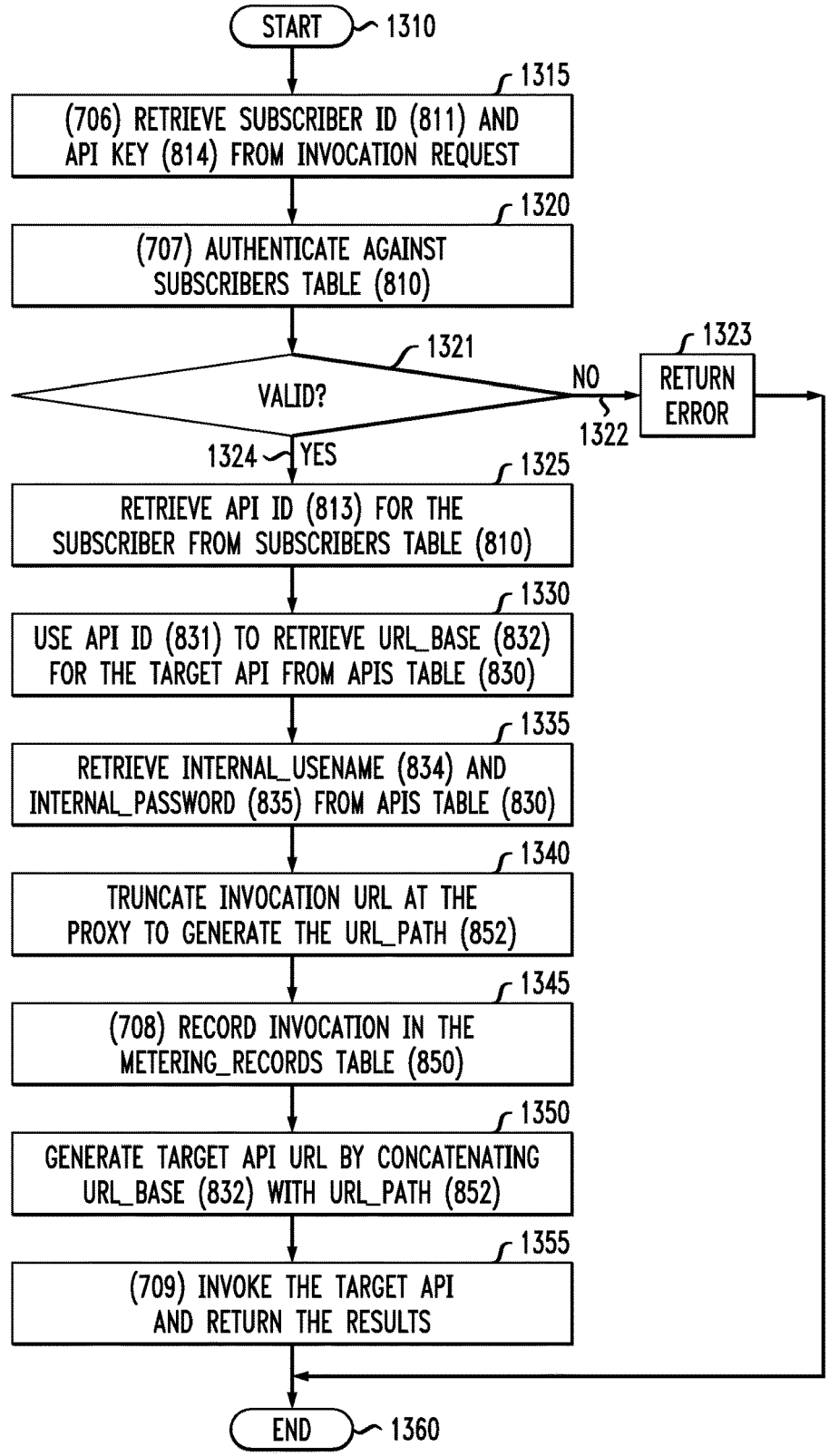
FIG. 13 is a flow chart depicting an exemplary method for invoking an API according to an embodiment of the present invention.

FIG. 13 is a flow chart depicting an exemplary method 1300 for invoking an API. Another method for invoking an API was described above with reference to steps 706 through 709 of method 700 shown in FIG. 7B. Method 1300 starts at step 1310. In step 1315, the subscriber ID (e.g., 811 in FIG. 8) and API key (e.g., 814 in FIG. 8) are retrieved from an invocation request. The invocation request may include the subscriber ID and/or API key, for example, as an HTTP authentication header, embedded in the proxy URL path, or as a URL parameter. See the preceding discussion with reference to step 706 in FIG. 7B.

In step 1320, the subscriber ID (e.g., 811 in FIG. 8) and API key (e.g., 814 in FIG. 8) retrieved from the request in step 1315 are authenticated against the SUBSCRIBER table (e.g., 810 in FIG. 8). This authentication may include, for example, using the subscriber ID retrieved from the request in step 1315 as a primary key (e.g., 811 in FIG. 8) to the SUBSCRIBER table (e.g., 810 in FIG. 8) then, if the SUBSCRIBER table has a record whose subscriber ID matches that retrieved from the request, verifying that the API key of that record (e.g., 814 in FIG. 8) also matches the API key retrieved from the request. See the preceding discussion with reference to step 707 in FIG. 7B.

Decision block 1321 tests to see whether step 1320 successfully authenticated the subscriber ID and API key retrieved from the request in step 1315 against the SUBSCRIBER table. If not (branch 1322), then an error is returned in step 1323 and the method ends in step 1360.

If authentication was successful (branch 1324), the API ID (e.g., 813 in FIG. 8) for the subscriber is retrieved from the SUBSCRIBERS table (e.g., 810 in FIG. 8) in step 1325, and then used in step 1330 as a primary key (e.g., 831 in FIG. 8) in the APIS table (e.g., 830 in FIG. 8) to retrieve the URL_BASE (e.g., 832 in FIG. 8) for the target API.

In step 1335, the INTERNAL_USERNAME (e.g., 834 in FIG. 8) and INTERNAL_PASSWORD (e.g., 835 in FIG. 8) are also retrieved from the APIS table (e.g., 830 in FIG. 8). Step 1335 could potentially involve the use of the API ID (e.g., 813 in FIG. 8) retrieved from the SUBSCRIBERS table in step 1325 as a primary key (e.g., 831 in FIG. 8) in the APIS table (e.g., 830 in FIG. 8) in a manner similar to that discussed with reference to step 1330. However, as discussed above with reference to FIG. 8, the INTERNAL_USERNAME (e.g., 834 in FIG. 8) and INTERNAL_PASSWORD (e.g., 835 in FIG. 8) are expressly indicated as being optional fields within the APIS table (e.g., 830 in FIG. 8), and thus step 1335 might also be optional in certain embodiments.

In step 1340, the invocation URL is truncated at the proxy to generate the URL_PATH (e.g., 852 in FIG. 8). In step 1345, the invocation is recorded in the metering records table (e.g., 850 in FIG. 8). See the preceding discussion with reference to step 708 in FIG. 7B. In step 1350, the target API URL is generated by concatenating the URL_BASE (e.g., 832 in FIG. 8) retrieved in step 1330 with the URL_PATH (e.g., 852 in FIG. 8) generated in step 1340. In step 1355, the target API is invoked (e.g., using the target API URL generated in step 1350) and the results are returned. See the preceding discussion with reference to step 709 in FIG. 7B. Method 1300 ends at step 1360.

FIG. 14 is a flow chart depicting an exemplary method 1400 for generating a metering report for a marketplace. Another method for generating a metering report for a marketplace was described above with reference to steps 710 through 712 of method 700 shown in FIG. 7C. Method 1400 starts at step 1410. In step 1420, the marketplace ID is retrieved from the registration request. The registration request may include the marketplace ID, for example, as an HTTP authentication header, embedded in the proxy URL path, or as a URL parameter. See the preceding discussion with reference to step 710 in FIG. 7C.

In step 1430, METERING_RECORDS (e.g., table 850 in FIG. 8) is joined with SUBSCRIBERS (e.g., table 810 in FIG. 8), then filtering on marketplace ID (e.g., column 812 in SUBSCRIBERS table 810 shown in FIG. 8). Note that, as shown in FIG. 8, column 851 (SUBSCRIBER) of METER_RECORDS table 850 is a foreign key into SUBSCRIBERS table 810. See the preceding discussion with reference to step 711 in FIG. 7C.

In step 1440, the report is generated. In step 1450, the report is formatted and returned to the marketplace caller. See the preceding discussion with reference to step 712 in FIG. 7C. Method 1400 ends at step 1460.

FIG. 15 is a flow chart depicting an exemplary method 1500 for generating a metering report for a provider. Another method for generating a metering report for a provider was described above with reference to steps 713 through 715 of method 700 shown in FIG. 7C. Method 1500 starts at step 1510. In step 1520, the provider ID is retrieved from the registration request. The registration request may include the provider ID, for example, as an HTTP authentication header, embedded in the proxy URL path, or as a URL parameter. See also the preceding discussion with reference to step 713 in FIG. 7C.

In step 1530, METERING_RECORDS (e.g., table 850 in FIG. 8) is joined with SUBSCRIBERS (e.g., table 810 in FIG. 8) and APIS (e.g., table 820 in FIG. 8), then filtering on prover ID (e.g., column 822 in APIS table 820 shown in FIG. 8). Note that, as shown in FIG. 8, column 851 (SUBSCRIBER) of METER_RECORDS table 850 is a foreign key into SUBSCRIBERS table 810, and column 813 (API) of SUBSCRIBERS table 810 is a foreign key into APIS table 820. See also the preceding discussion with reference to step 711 in FIG. 7C.

In step 1540, the report is generated. In step 1550, the report is formatted and returned to the provider caller. See the preceding discussion with reference to step 712 in FIG. 7C. Method 1500 ends at step 1560.

Given the discussion thus far, it will be appreciated that, in general terms, an exemplary method for providing a client with access to an API available from a provider comprises: receiving from a marketplace a request to subscribe to the API, wherein the subscription request is responsive to the client selecting the API from a catalog of the marketplace; generating a subscriber identifier uniquely associated with the request by the client to subscribe to the selected API; creating an authorization record within a proxy, the authorization record indicating that a request by the client to invoke the API received by the proxy should be forwarded to the provider from which the API is available if the request to invoke the API comprises the subscriber identifier; providing the generated subscriber identifier and an address of the proxy to the marketplace, whereby the client is configured to invoke the API by sending a request comprising the subscriber identifier to the address of the proxy.

Furthermore, given the discussion thus far, it will be appreciated that, in general terms, another exemplary method for providing a client with access to an API available from a provider, the method comprising: receiving from the client a request to invoke the API; responsive to receiving the request to invoke the API, accessing a database to determine whether the client is subscribed to the API; and responsive to determining that the client is subscribed to the API: extracting metering information from the request, storing the metering information in the database, and forwarding the request to the provider.

Even further, given the discussion thus far, it will be appreciated that, in general terms, an exemplary system includes a processor and a memory; the system implements an application program interface (API) proxy associated with a specified API, wherein the API proxy is operative to: receive a request for invocation of the specified API from the client; extract a subscriber identifier from the request; authenticate the subscriber identifier extracted from the request; and responsive to authentication of the subscriber identifier extracted to the request, allow the request to pass through the API proxy to a provider of the specified API.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 1, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 1) running a server program. It will be understood that such a physical server may or may not include a display and keyboard.

One or more embodiments are particularly significant in the context of a cloud or virtual machine environment, although this is exemplary and non-limiting. Reference is made back to FIGS. 1-3 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks in FIGS. 4-6. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for providing a client with access to invoke an application program interface (API) available from a provider, the method comprising:
receiving from a marketplace a request to subscribe to the API, wherein the subscription request is responsive to the client exclusively selecting the API from a catalog of the marketplace;
generating a subscriber identifier specific to the selected API, wherein the client is not authorized to invoke the API until the subscriber identifier is generated responsive to the subscription request;
creating an authorization record within a proxy, the authorization record indicating that a request by the client to invoke the API received by the proxy should be forwarded to the provider from which the API is available if the request to invoke the API comprises the subscriber identifier; and
providing the generated subscriber identifier and an address of the proxy to the marketplace, whereby the client is configured to invoke the API by sending a request comprising the subscriber identifier to the address of the proxy.

2. The method of claim 1, wherein creating the authorization record further comprises generating an API key corresponding to the subscriber identifier, storing the subscriber identifier and the API key, and providing the API key to the marketplace, whereby the request to invoke the API further comprises the API key.

3. The method of claim 2, wherein storing the subscriber identifier and the API key comprises storing the API key in a table with the subscriber identifier as primary key.

4. The method of claim 2, wherein the authorization record indicates that a request by the client to invoke the API received by the proxy should be forwarded to the provider from which the API is available if the request to invoke the API comprises the subscriber identifier and the API key.

5. The method of claim 1, wherein the proxy is an API proxy used solely to control access to a set of at least one API, the set of at least one API comprising the selected API.

6. The method of claim 1, wherein the proxy is an API proxy used solely to control access to the selected API.

7. The method of claim 1, further comprising using an identifier of the selected API retrieved from the subscription request to determine the provider from which the selected API is available.

8. The method of claim 7, wherein using an identifier of the selected API retrieved from the subscription request to find the provider from which the selected API is available comprises using the identifier of the selected API as primary key within a table to find the provider.

9. The method of claim 7, wherein the identifier of the selected API is embedded in the subscription request as an HTTP (hypertext transport protocol) authentication header.

10. The method of claim 7, wherein the identifier of the selected API is embedded in the subscription request as a proxy URL path.

11. The method of claim 7, wherein the identifier of the selected API is embedded in the subscription request as a URL parameter.

12. The method of claim 1, wherein the address of the proxy comprises a uniform resource locator (URL) of the proxy.

13. The method of claim 1, further comprising using an identifier of the marketplace retrieved from the subscription request to determine whether the marketplace is registered.

14. The method of claim 13, further comprising returning an error if the marketplace is not registered.

15. The method of claim 13, wherein using an identifier of the marketplace retrieved from the subscription request to determine whether the marketplace is registered comprises using the identifier of the marketplace as primary key within a table.

16. The method of claim 13, further comprising using an identifier of the selected API retrieved from the subscription request to determine whether the selected API is registered.

17. The method of claim 16, further comprising returning an error if the marketplace or the selected API is not registered.

18. The method of claim 16, wherein using an identifier of the marketplace retrieved from the subscription request to determine whether the marketplace is registered comprises using the identifier of the marketplace as primary key within a first table, and wherein using an identifier of the marketplace retrieved from the subscription request to determine whether the marketplace is registered comprises using the identifier of the marketplace as primary key within a second table.

19. The method of claim 18, wherein:
creating the authorization record further comprises generating an API key corresponding to the subscriber identifier, storing the subscriber identifier and the API key, and providing the API key to the marketplace, whereby the request to invoke the API further comprises the API key; and
storing the subscriber identifier and the API key comprises storing the identifier of the marketplace, the identifier of the selected API, and the API key in a third table with the subscriber identifier as primary key.

20. The method of claim 13, wherein:
creating the authorization record further comprises generating an API key corresponding to the subscriber identifier, storing the subscriber identifier and the API key, and providing the API key to the marketplace, whereby the request to invoke the API further comprises the API key; and
storing the subscriber identifier and the API key comprises storing the identifier of the marketplace and the API key in a table with the subscriber identifier as primary key.

21. The method of claim 1, wherein the subscriber identifier is further specific to the client.

* * * * *